(12) United States Patent
Kaylor et al.

(10) Patent No.: US 6,961,079 B2
(45) Date of Patent: Nov. 1, 2005

(54) PORTABLE TRAFFIC SURVEILLANCE SYSTEM

(75) Inventors: Kenneth Kaylor, Woodinville, WA (US); Brian Kaylor, Vacaville, CA (US)

(73) Assignee: Kenneth Kaylor, Woodinville, WA (US)

( * ) Notice: Subject to any disclaimer, the term of this patent is extended or adjusted under 35 U.S.C. 154(b) by 437 days.

(21) Appl. No.: 10/176,959

(22) Filed: Jun. 21, 2002

(65) Prior Publication Data

US 2003/0016288 A1 Jan. 23, 2003

Related U.S. Application Data

(60) Provisional application No. 60/300,252, filed on Jun. 21, 2001.

(51) Int. Cl.$^7$ ............................................. H04N 7/18
(52) U.S. Cl. ....................................... 348/49; 348/143
(58) Field of Search ................................. 348/143–160

(56) References Cited

U.S. PATENT DOCUMENTS

| | | | | |
|---|---|---|---|---|
| 4,887,080 A | * | 12/1989 | Gross | ........................ 340/937 |
| 5,774,569 A | * | 6/1998 | Waldenmaier | ............... 382/100 |
| 6,285,297 B1 | * | 9/2001 | Ball | ........................ 340/932.2 |
| 6,377,191 B1 | * | 4/2002 | Takubo | ........................ 340/937 |
| 6,466,260 B1 | * | 10/2002 | Hatae et al. | ................. 348/149 |
| 6,747,574 B2 | * | 6/2004 | Butzer et al. | ................ 340/907 |
| 6,754,663 B1 | * | 6/2004 | Small et al. | ................. 707/102 |

* cited by examiner

*Primary Examiner*—Andy Rao
(74) *Attorney, Agent, or Firm*—Seed IP Law Group PLLC

(57) ABSTRACT

A video system having a plurality of video cameras mounted on a utility pole a distance above the ground, a box mounted on the utility pole below the video cameras, a screen splitter contained inside the box and configured to receive a plurality of video images from the video cameras and to combine the plurality of images into a single video image and a video recorder, also inside the box, configured to record the single video image from the screen splitter. A time and date stamp is recorded on each frame of the single video image. Cables from the plurality of video cameras pass through a conduit extending down from the cameras and into the box to the screen splitter. The top of the conduit is formed of interlocking segments, which can be stored in a rack located inside a door of the box.

21 Claims, 10 Drawing Sheets

PORTABLE TRAFFIC SURVEILLANCE SYSTEM

CROSS-REFERENCE TO RELATED APPLICATION

This application claims the benefit of U.S. Provisional Patent Application No. 60/300,252, filed Jun. 21, 2001, where this provisional application is incorporated herein by reference in its entirety.

BACKGROUND OF THE INVENTION

1. Field of the Invention

The present invention relates to the field of video surveillance, and in particular to equipment for use in applications where the need for video surveillance is temporary.

2. Description of the Related Art

As traffic in urban environs increases, the need for improvements to infrastructure also increases. This need is not always matched by available resources for road improvements; thus, a way to prioritize expenditures of resources is needed. One way to do this is to conduct traffic studies that monitor and analyze motor vehicle and pedestrian traffic at locations identified as requiring improvement.

Traffic studies may examine one or more of several components of traffic operation. For example, an intersection might be monitored for traffic density, i.e., how many vehicles pass through the intersection at any given time, and in which directions? The intersection might be monitored for compliance, i.e., how many traffic infractions occur and at what times? A cross walk might be a safety concern for school children crossing a heavily traveled street, so a study might monitor vehicle speed and density as well as pedestrian crossing at that location at critical times. Railroad grade crossings are often a concern, and a study might examine traffic patterns and behavior of motorists with respect to a grade crossing.

Any one of these studies might need to be conducted repeatedly at different times and locations in order to accurately determine where improvements or increased patrols by police are justified or will be most effective.

A common method of conducting such studies is to place one or more human observers at the particular location. There are several drawbacks to this method. First, the expense of paying observers to watch traffic, especially for extended periods, can be significant. Second, an observer may miss one event while recording another. Accuracy of recording is also an issue. For example, will an observer be able to accurately determine whether a light changed just before or just after a car enters an intersection. As the amount of data required from a single observer increases, the accuracy of the data collected will decrease. The danger also exists that an observer will falsify data, either to achieve a desired result or out of an unwillingness to persevere in the study.

While other methods and devices exist for performing such studies, these also have particular drawbacks. For example, temporary sensors placed across a road record numbers of vehicles and times of passing, but they do not record other factors, such as traffic signals or pedestrian traffic. In addition, such sensors become less effective in multi-lane roadways, and their accuracy can be compromised by multi-axel vehicles, which can be miscounted. Conventional video systems are expensive to supply and expensive to install and monitor.

BRIEF SUMMARY OF THE INVENTION

An embodiment of the invention provides a video system. The system includes a plurality of video cameras mounted on a utility pole a distance above the ground; a box mounted on the utility pole below the video cameras; a screen splitter contained inside the box and configured to receive a plurality of video images from the video cameras and to combine the plurality of images into a single video image and a video recorder also inside the box and configured to record the single video image, from the screen splitter. A time and date stamp is recorded on each frame of the single video image.

According to an embodiment of the invention, cables from the plurality of video cameras pass through a conduit extending down from the cameras and into the box to the screen splitter. The top of the conduit is configured to prevent rain from entering the conduit. The conduit may be formed of interlocking segments, which can be stored in a rack located inside a door of the box.

According to another embodiment of the invention, the box is mounted on a length of pipe at one end thereof. The box includes legs on the bottom, and the pipe is affixed to the box such that an end of the pipe extends a distance below the pipe equal to the height of the legs. Thus, the pipe is held in a vertical orientation by the box. The cameras are mounted on the upper end of the pipe.

In another embodiment of the invention, a first video camera is mounted on a utility pole adjacent to a traffic intersection at a height sufficient to have an unobstructed view of a first traffic signal light. A second video camera is also mounted on the utility pole close to the first video camera and aimed and focused on the stop bar of the lanes of traffic controlled by the first signal light. A box mounted on the utility pole below the first and second video cameras contains a screen splitter for combining the video images from the first and second video cameras into a single video image and a video image recorder coupled to the screen splitter and configured to record the combined video image from the screen splitter. Cables connect the video cameras to the screen splitter.

A method for the operation of the invention is also provided, including collecting a video image of a traffic signal light from a camera mounted on a pole adjacent to a traffic intersection; collecting a video image of a lane or lanes of traffic passing a stop bar of an intersection, where the lane or lanes are controlled by the traffic signal, from a second camera mounted on the pole; combining the first and second video images such that both images appear as split screen images of a single video image; and recording the single video image, together with a time and date stamp on each frame of the video image, onto a video medium.

BRIEF DESCRIPTION OF THE SEVERAL VIEWS OF THE DRAWING(S)

For understanding the present invention, a description of a preferred embodiment thereof is now provided, purely as a non-limiting example, with reference to the attached drawings, wherein.

DETAILED DESCRIPTION OF THE INVENTION

Figure 1:
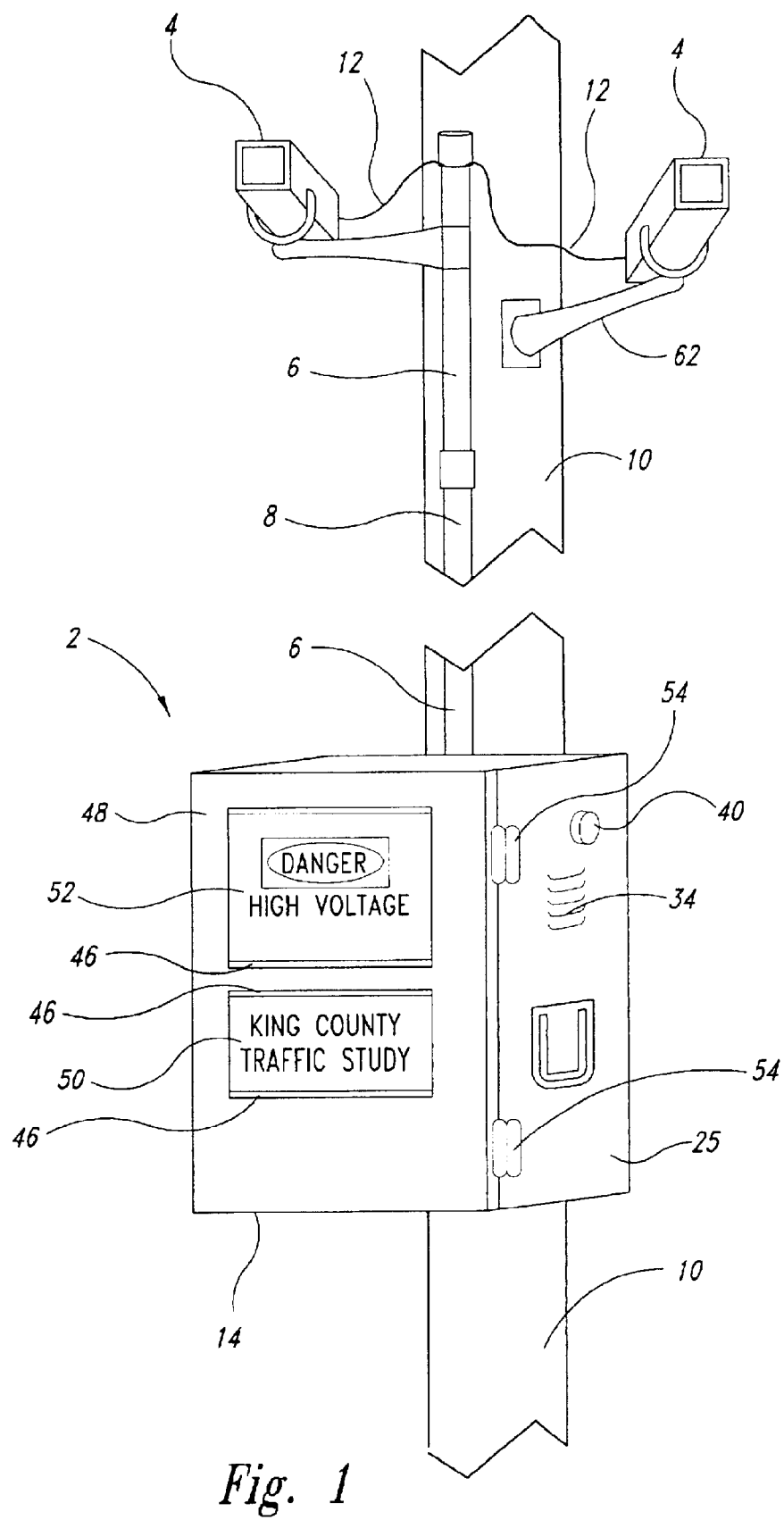
FIG. 1 shows view of the inventive system mounted on a utility pole.
Figure 2:
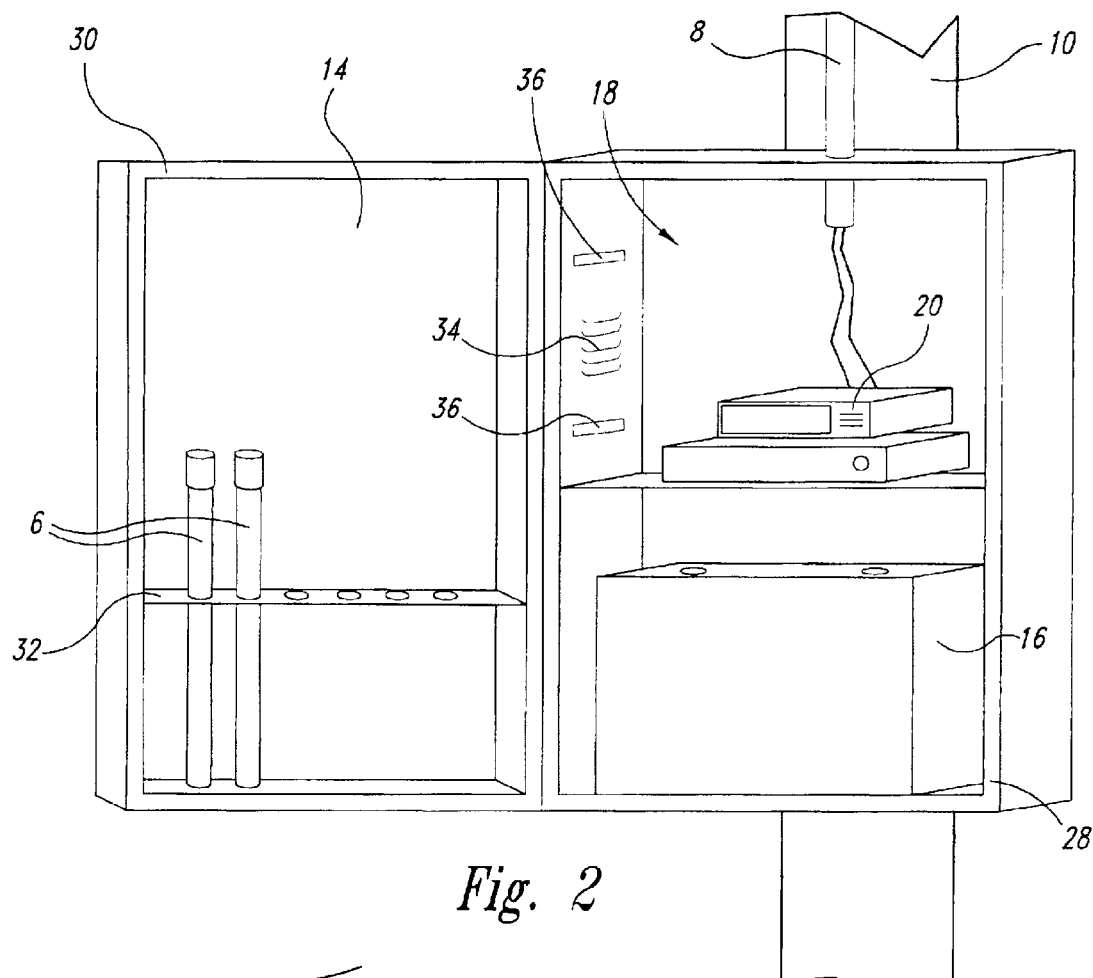
FIG. 2 shows a close-up view of a box of the system, showing the interior of the box.
Figure 5:
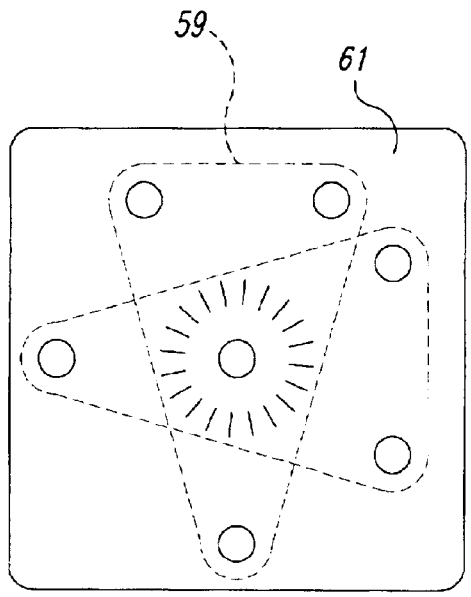
FIGS. 5–7B show various embodiments of the camera mounting bracket according to the principles of the invention.

According to a first embodiment of the invention, a weatherproof box 2 is provided. The box 2 is mounted to a utility pole 10 adjacent to an intersection as shown in FIGS. 1 and 2. A pipe or conduit 8 is attached to the box 2 and rises above the box 2 to a location where a plurality of cameras 4 are attached to the utility pole 10. Video cable 12 from the cameras 4 is routed through the pipe 8 into the box 2. The pipe 8 may be of plastic or metal and is typically segmented to permit storage of the individual segments 6 within the door 14 of the box 2, as shown in FIGS. 2 and 5. The cameras pictured are depicted encased in weatherproof housings which, for the purposes of this description, will be regarded as part of the camera 4.

Figure 4:
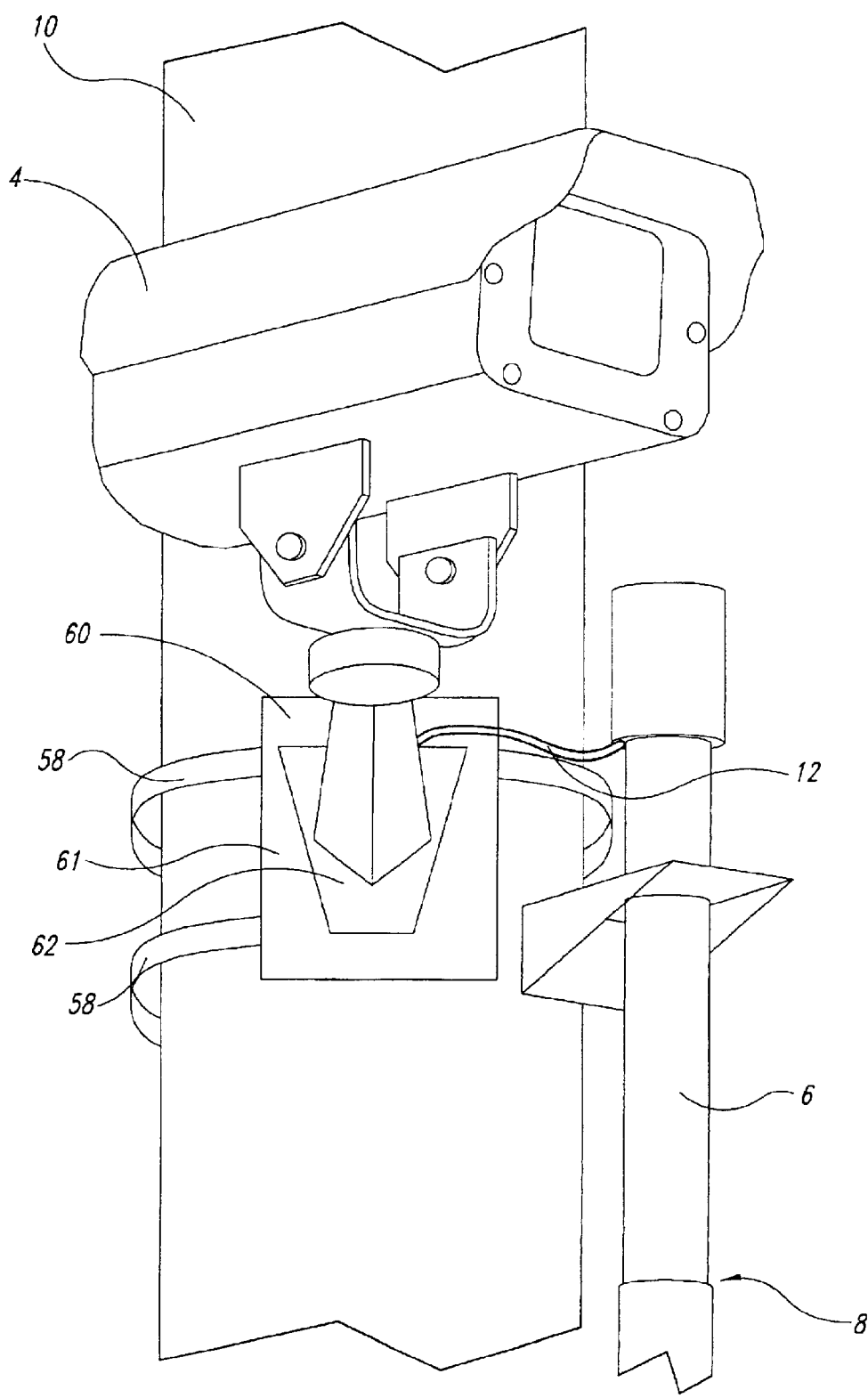
FIG. 4 shows a close-up view of a camera mounted on the utility pole according to the principles of the invention.

As shown in FIGS. 2 and 5, the dimensions of the box 2 are sufficient to accommodate a battery 16 and the appropriate electronics 18 for the system, including a recording device 20. This device 20 may be a video recorder, a computer processor with a hard drive and software configured to store video images, a video disc recorder or some other video storage device. The conduit 8, whether segmented or a single unit, is provided with a watertight seal 22 where it passes through the top wall 24 of the box 2. The top of the pipe 8 is configured to prevent rainwater from running into the pipe 8 and down into the box 2, as shown in FIG. 4. The opening of the box 2 has a lip 28 around it, which accommodates a gasket 30 to make the box 2 watertight when the door 14 closes upon it. The gasket 30 may be closed cell foam rubber or some other type of material appropriate to provide a weather tight seal. The gasket 30 may be affixed to the lip 28 or to the inside of the door 14 of the box 2, positioned so as to bear against the lip 28 when the door 14 is closed. A rack 32 in the door 14 of the box 2 accommodates a plurality of jointed pipe segments 6 in a secure fashion, permitting them to be easily removed while, at the same time, holding them securely when the box 2 is transported or when the door 14 is opened and closed. The box 2 may be provided with louvered vents 34 in the side walls 25 to permit air circulation within the box 2, while preventing rain water from entering the box 2. Brackets 36 inside the vents 34 are configured to hold air filters (not shown) to prevent contaminants from entering the box 2. Closures (not shown) may also be fitted into the brackets 36 to seal the interior of the box 2.

The electronic components 18 in the box 2 are selected according to the needs of a particular application. They may include a video tape recorder or other video recording device 20, a screen splitter 23 to provide a split-screen image from a plurality of cameras 4, a time and date stamp generator 27, and a pan/tilt/zoom control 29 to position and focus the cameras 4. The box 2 may also contain a battery charger 31 for charging the battery 16 without removal from the box 2. In such a case, the box 2 may be provided with an AC connector 40 on the outside of the box 2. The connector 40 is provided with a cap or a seal (not shown) to keep it weather-tight. By means of this connector 40, a power cable (not shown) may be attached to the box 2 and AC power provided to the battery charger 31 for charging the battery 16. Typically, a deep cycle marine battery is used to power the electronics 18, in those cases where battery power is required. In cases where a power feed is available, the battery 18 may not be required. In such a case, appropriate connectors and adaptors are provided to accommodate the electronic components 18.

Standardized cables 12 may be provided for the system, employing multi-pin connectors, known in the art, on each end. These connectors are configured to accommodate any desired configuration of the cameras 4. For example, the same cable 12 provides power to, and video return from a camera 4. It may be used to connect a black and white camera, an infrared camera, or a color camera, and may also include conductors for focus and zoom control of the camera 4 as well as pan and tilt motor control on the camera supports (not shown).

Alternatively, separate cables may be employed for power, video and camera control, using appropriate connectors for each.

Figure 8:
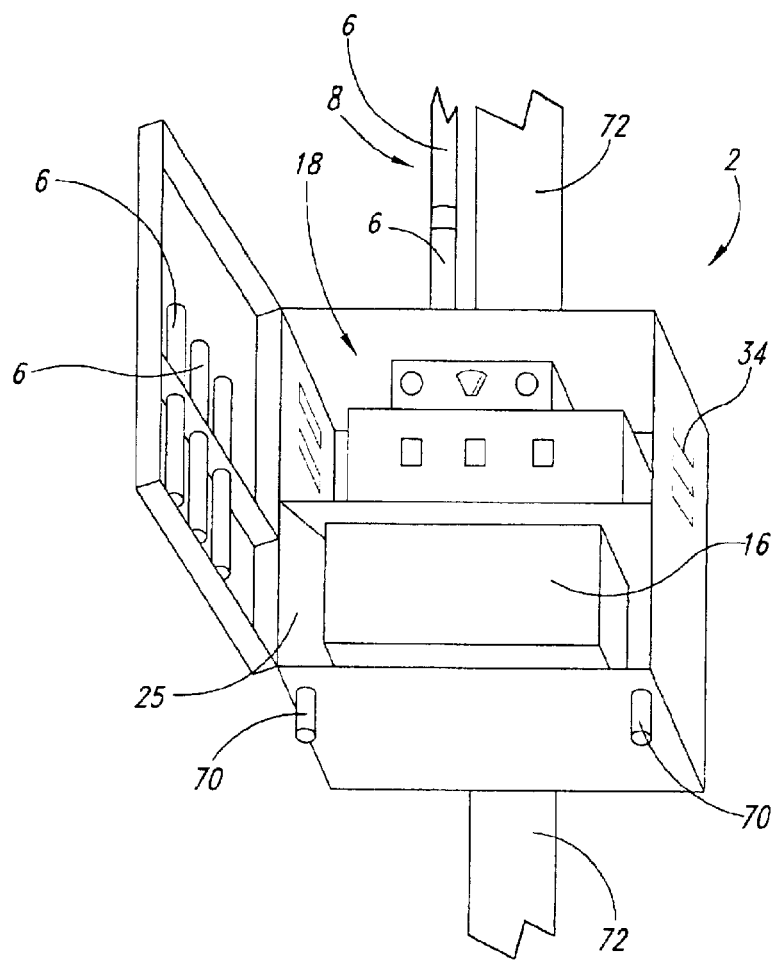
FIG. 8 shows a view of the box according to an alternative embodiment of the invention in which the system is mounted on a length of pipe.

The front of the box 2 may be provided with brackets or holders 46 to accommodate appropriate markings or placards 50. For example, a high voltage placard 52, of the type commonly seen on utility boxes may be placed on the front of the box 2, as shown in FIG. 8. Such a placard will tend to dissuade unauthorized individuals from opening the box 2. A second bracket 46 on the front of the box 2 accommodates an informational placard 50, which may list a contact agency and phone number for inquiries. The box 2 is also provided with secure latches 54, which may include an integral lock or hasp for a padlock.

Figure 3:
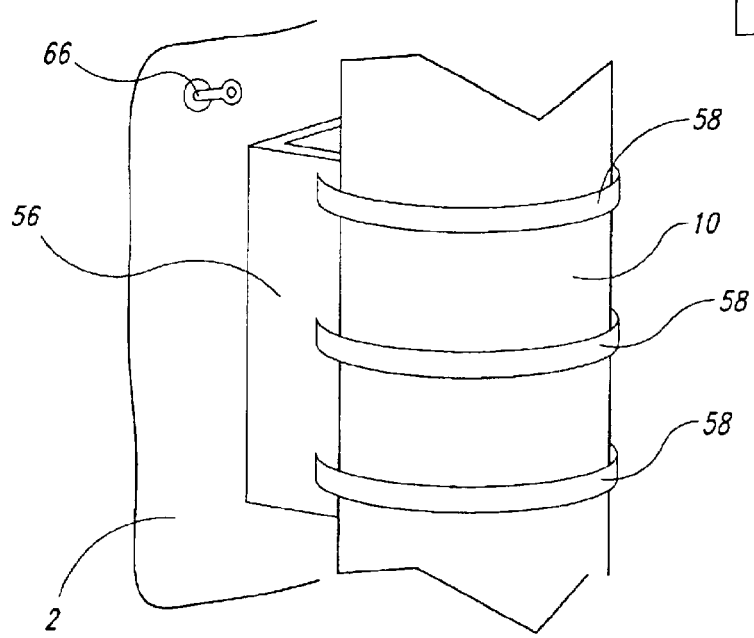
FIG. 3 shows a shows a detail of the mounting bracket holding the box to the utility pole.

The box 2 is commonly mounted on a utility pole 10 using a bracket 56 designed for this purpose. As shown in FIG. 3, stainless steel straps 58, passing through slots in the bracket 56, pass around the utility pole 10 and are clamped tightly to the pole 10, pulling the bracket 56 and the box 2 tightly against the pole 10.

A pair of eyebolts 66, securely fastened to the back of the box 2, provide accommodation for a security chain (not shown) that is passed around the utility pole 10 and attached at both ends to the eyebolts 66, typically employing a padlock as a security device.

In a similar fashion, the cameras 4 are mounted to the utility pole 10 using brackets 60, designed for that purpose, and stainless steel straps 58, as shown in FIG. 4. A camera arm 62 is bolted to the bracket 60, the camera arm including appropriate swivels to permit pointing and angling the camera as required. In some embodiments the camera arm is equipped with powered adjustments, permitting remote manipulation of the camera.

As can be seen in FIG. 4, the camera arm 62 is mounted to a faceplate 61 of the bracket 60 using a plurality of bolts passing through holes in the faceplate 61 and the arm 62.

Commercially available brackets are generally provided with a single set of holes for mounting a camera arm. If it becomes necessary to mount the bracket on a structure that is not vertical, it may not be possible to level the camera.

FIGS. 5–7B show different configurations of the faceplate 61 of a mounting bracket 60 for mounting cameras 4 to poles, according to various embodiments of the invention. According to one embodiment of the invention, illustrated in FIG. 5, a bracket 60 is provided, in which the faceplate 61 is configured to receive the mounting arm 62 of the camera 4 in either a horizontal or a vertical configuration. Dotted outlines 59 indicate the footprint of the camera arm 62 in a horizontal and vertical configuration. This allows the camera 4 to be mounted either on the vertical utility pole 10, or a horizontal cross-arm (not shown), such as might be found at an intersection, supporting the traffic lights above the road. According to another embodiment of the invention, also shown in FIG. 5, a central mounting hole 63 is provided for the camera arm 62. A bolt is passed through the hole 63 and into a central threaded aperture in the back side of the camera arm 62. The arm may be rotated on the bolt to the desired position and the bolt tightened in that position. This embodiment may also include an annular feature 64 on the surface of the faceplate, having a sawtooth configuration. This feature 64 mates with a similar feature on the back surface of the camera arm (not shown), providing a secure mating between the arm 62 and the bracket 60, and preventing the arm 62 from rotating out of a desired orientation.

Figure 6:
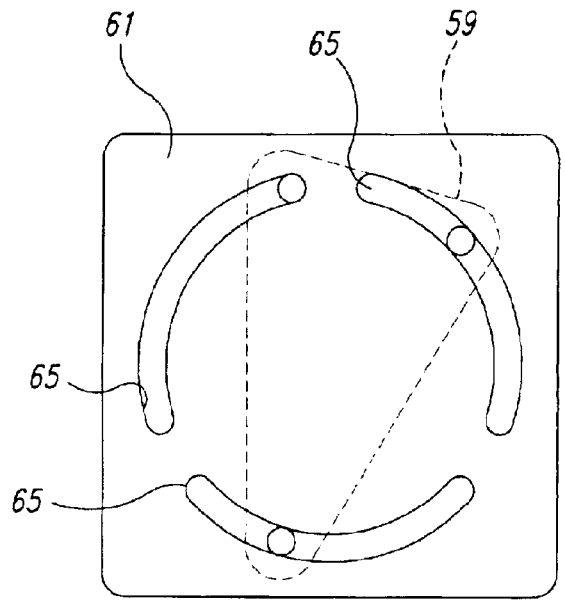
Figure 7A:
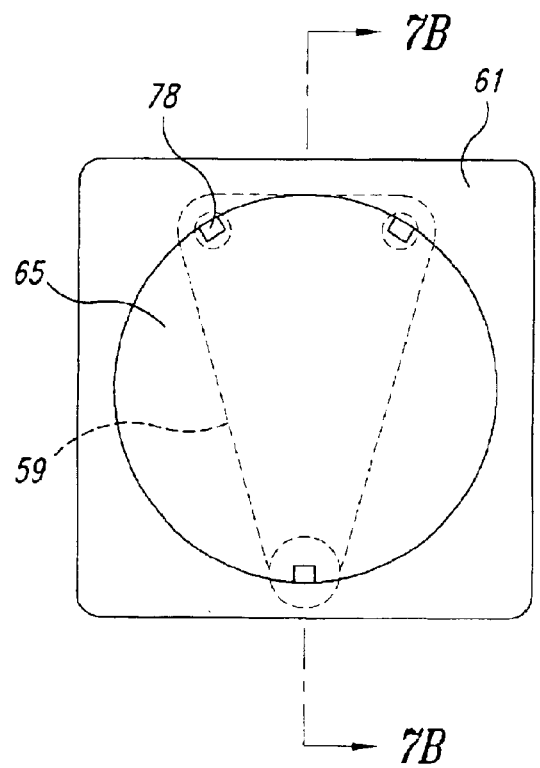
Figure 7B:
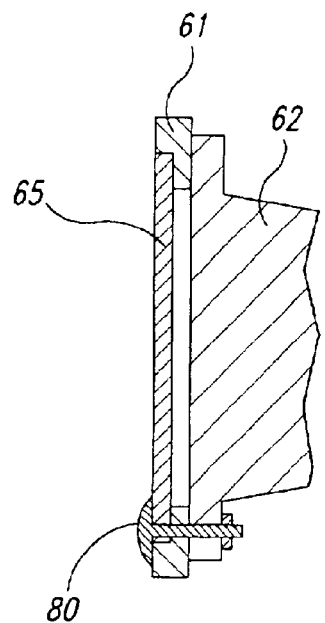

FIG. 6 shows a bracket faceplate 61 having an arrangement of slots 65, which are engaged from the back side by the heads of three carriage bolt that engage the camera arm 62, and which, through a combination of positioning the bolts in the slots 65 and/or reversing the orientation of the bracket 62, can accommodate any desired arm position. According to another embodiment of the invention, shown in FIGS. 7A and 7B, a bracket 62 is provided, on which a mounting plate 65 is located, having notches 78 sized and positioned to receive carriage bolts 80 from behind the faceplate 61. The mounting plate 65 may be rotated to a desired angle, and nuts on the front of the camera arm 62 tightened, fixing the plate 65 and the arm 62 at that angle, thus providing means to accommodate a angled mounting location.

While it is generally desired that the box 2 be mounted to a utility pole 10, in some cases a utility pole is not available. To facilitate such situations, a pair of sockets 66 are provided on the bottom of the box 2 and close to the front corners, near the door 14, as illustrated in FIG. 8. These sockets 66 accommodate a pair of legs 70. A length of pipe 72, for example, a sewer pipe, is affixed to the back of the box 2 through the use of the mounting bracket 56 and stainless steel straps 58 in the same manner as that described above, for mounting to a utility pole 10. The bottom of the pipe 72 is positioned to extend below the box 2 a distance matching the height of the legs 70, to provide a level base for the box 2 and to keep the box 2 above the ground in order to allow the door 14 to swing open and to keep ground water out of the box 2. The pipe 72 extends above the box 2 a distance and a height sufficient to provide the angle of view required for the cameras 4, which are then mounted to the upper portion of the pipe, also as described above.

Figure 9:
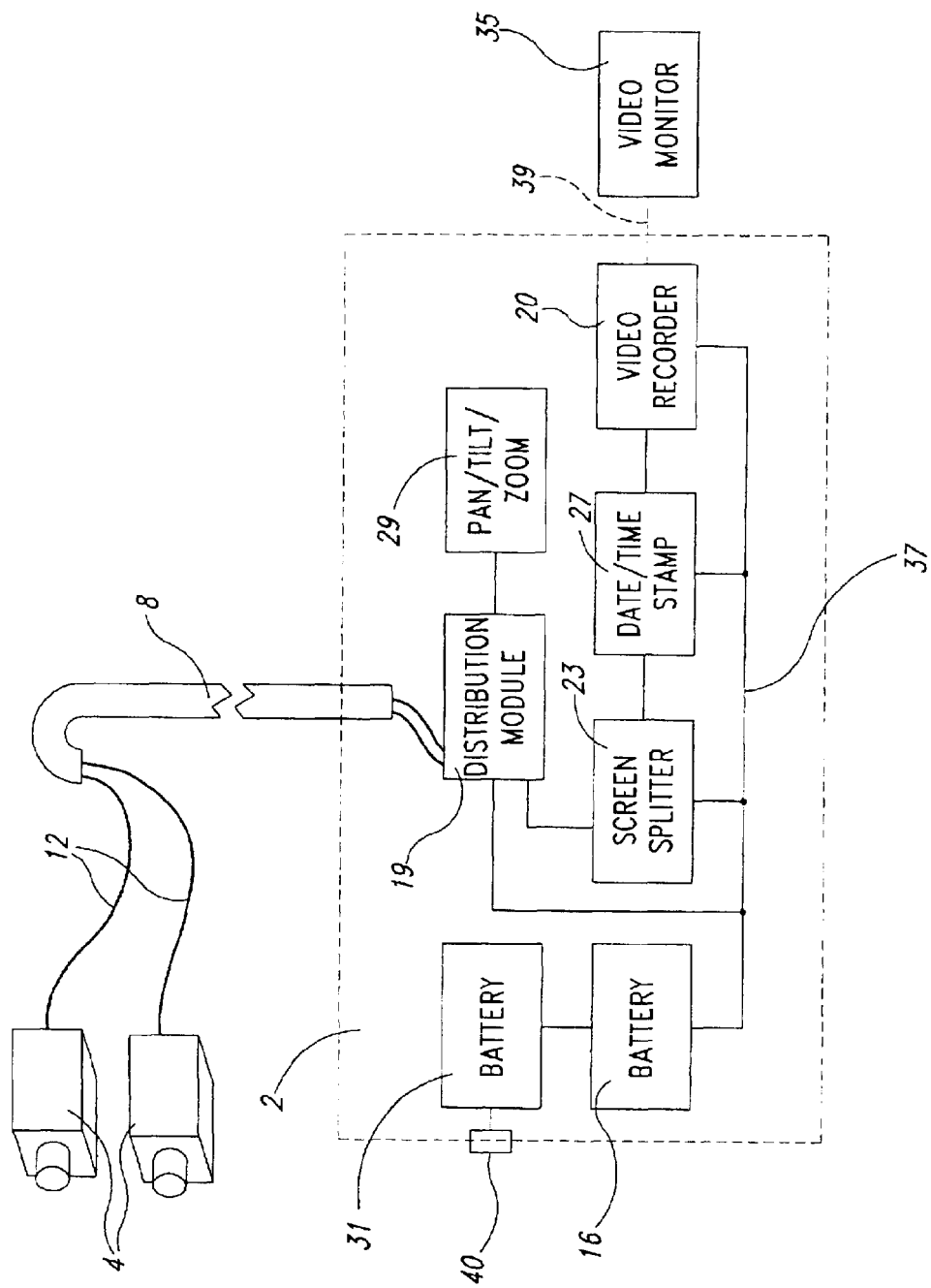
FIG. 9 is a diagrammatic representation of the electronic modules of the system.

FIG. 9 illustrates, diagrammatically, the portable video system according to a typical embodiment of the invention. A plurality of video cameras 4 pick up multiple images, which are transmitted, via cables 12 through the pipe 8 into the box 2. Within the box 2, a distribution module 19 receives the video signal and passes it to a screen splitter module 23, which combines the multiple images into a single image. The date/time stamp module 25 affixes a date and time to the image, which is then recorded by the recording device 20. The battery provides power to the components via power bus 37. The distribution module 19 also distributes power from the battery 16 to each of the cameras 4. The monitor 35, which is shown outside the box 2 is connected to an output of the video recorder 20 by a temporary connection 39 during installation to correctly align and focus the cameras 4, and then disconnected and removed from the box 2. Some embodiments of the invention may include a monitor 35 within the box 2. A pan/tilt/zoom control 29 may be provided for simple camera adjustment, or the installer may be obliged to manually position the cameras 4. In some embodiments a battery charger 31 is provided, in cases where it may be necessary to recharge the battery during operation. In such a case a connector 40 is provided for connection of an AC cable from outside the box.

The diagram of FIG. 9 is functional rather than structural, thus the functions of any of the modules may be performed by common devices. For example, a screen splitting device may combine the functions of distributing the incoming video images as well as attaching the time stamp to the image. An individual skilled in the art will easily understand the technologies of each of the modules.

According to a preferred embodiment of the invention, a recording device 20, capable of recording up to 24 hours of continuous video images, is included in the box 2. This device may be programmed to record continuously, in a case, for example, where all the traffic during a given period is to be recorded. In another application, it may be desired to record the traffic at peak hours only; in which case, the recording device is programmed to turn itself on and off appropriately, to capture video during those peak hours. In another application, it may be desired to record traffic during particular events, for example, at a train crossing during the approach and passage of a train as it passes a grade crossing. In such a case, the device is programmed to receive a signal as the train approaches, which signal would cause the device to turn on until a second signal is received which indicates the complete passage of the train. In another application, the high resolution available through continuous images may not be required. In such a case, the recording device may be programmed to record time-lapse images, which allows continuous recording for a much longer period of time.

Figure 10:
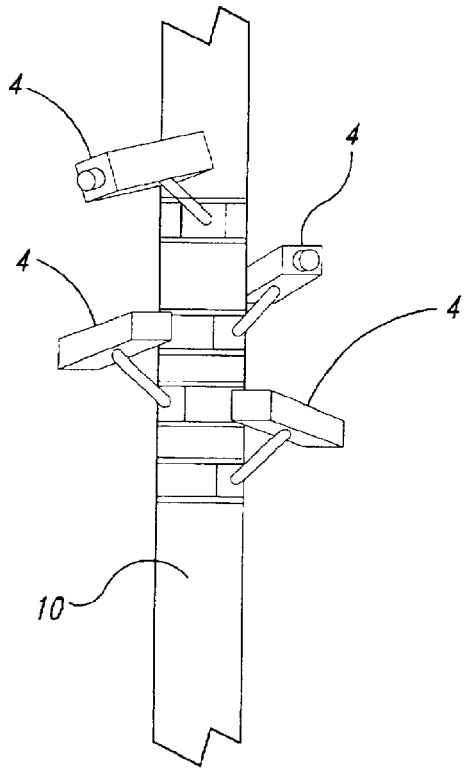
FIG. 10 is a view showing a configuration of a plurality of cameras mounted on the utility pole.
Figure 11:
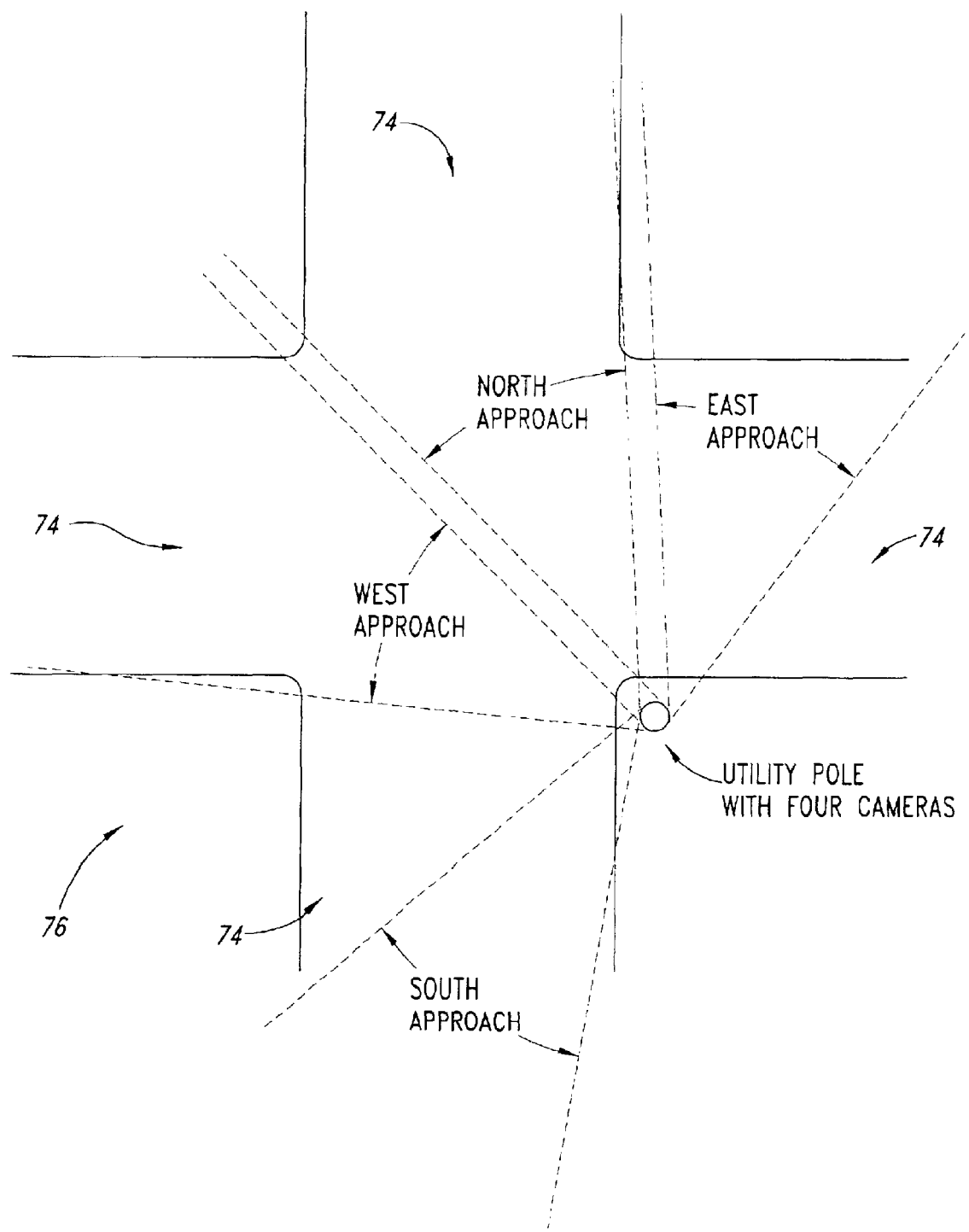
FIG. 11 illustrates the fields of view of the configuration of cameras shown in FIG. 10.

According to the principles of the invention, a plurality of cameras 4 is affixed to the utility pole 10 above the box 2 as shown in FIGS. 1 and 10. The exact number and configuration of the cameras 4 is determined by the requirements of the particular application. For example, as shown in FIG. 11, it is possible, with the four camera configuration illustrated in FIG. 10, to provide video coverage of four approaches 74 to a traffic intersection 76. In such an application, the video cameras 4 are positioned so that each one captures a different field of view of the approaches to the intersection 76. FIG. 10 shows one possible configuration of cameras 4 on the utility pole 10. The cables 12 for each of the plurality of cameras 4 pass down through the conduit 8 and into the box 2, where the images are processed by a screen splitter, which compiles them into a split-screen configuration to be recorded as a single image by the recording device 20. In such a case, where four cameras 4 are employed, the screen would be divided into four parts, permitting a viewer to see time synchronous images of the four approaches to the intersections simultaneously.

In another configuration, infrared cameras may be paired with normal daylight cameras. A timer or photodetector is used to switch the feed from one camera to the other. In this way, video surveillance or observation may be maintained under any light conditions.

Figure 12:
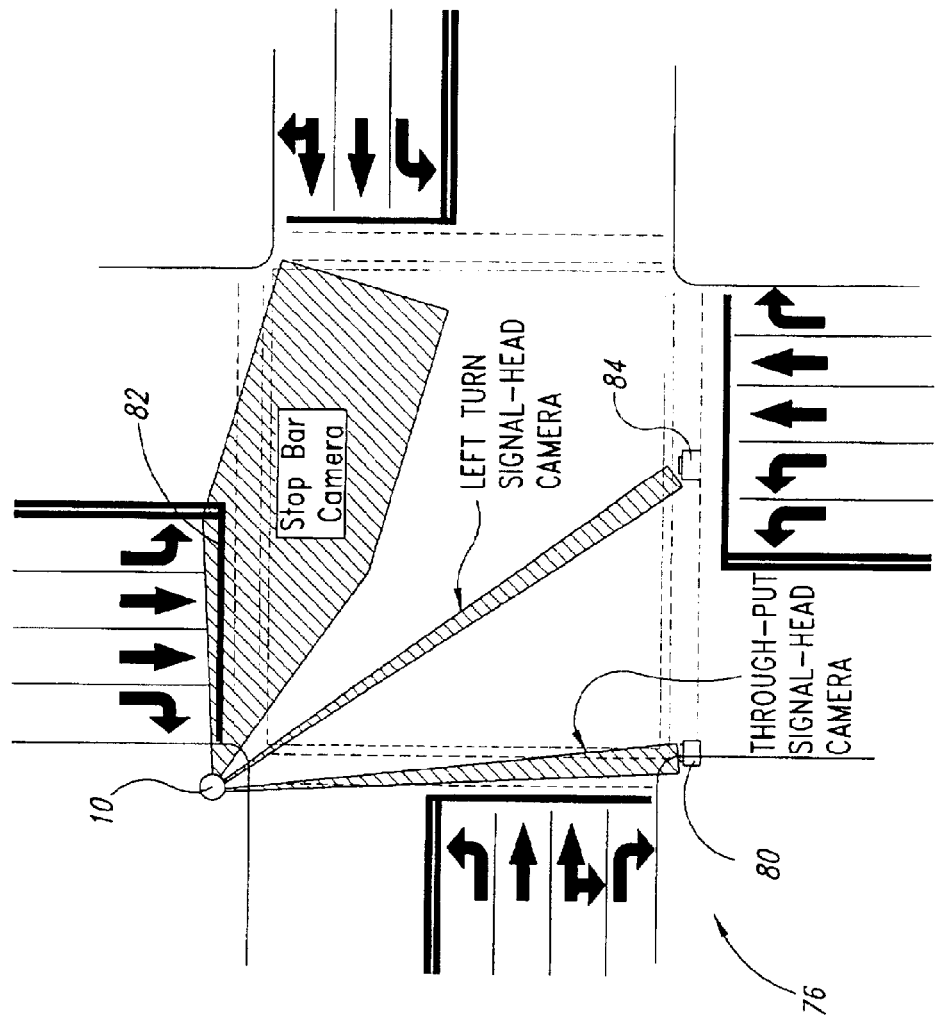
FIG. 12 illustrates an alternate configuration utilizing three cameras.
Figure 13:
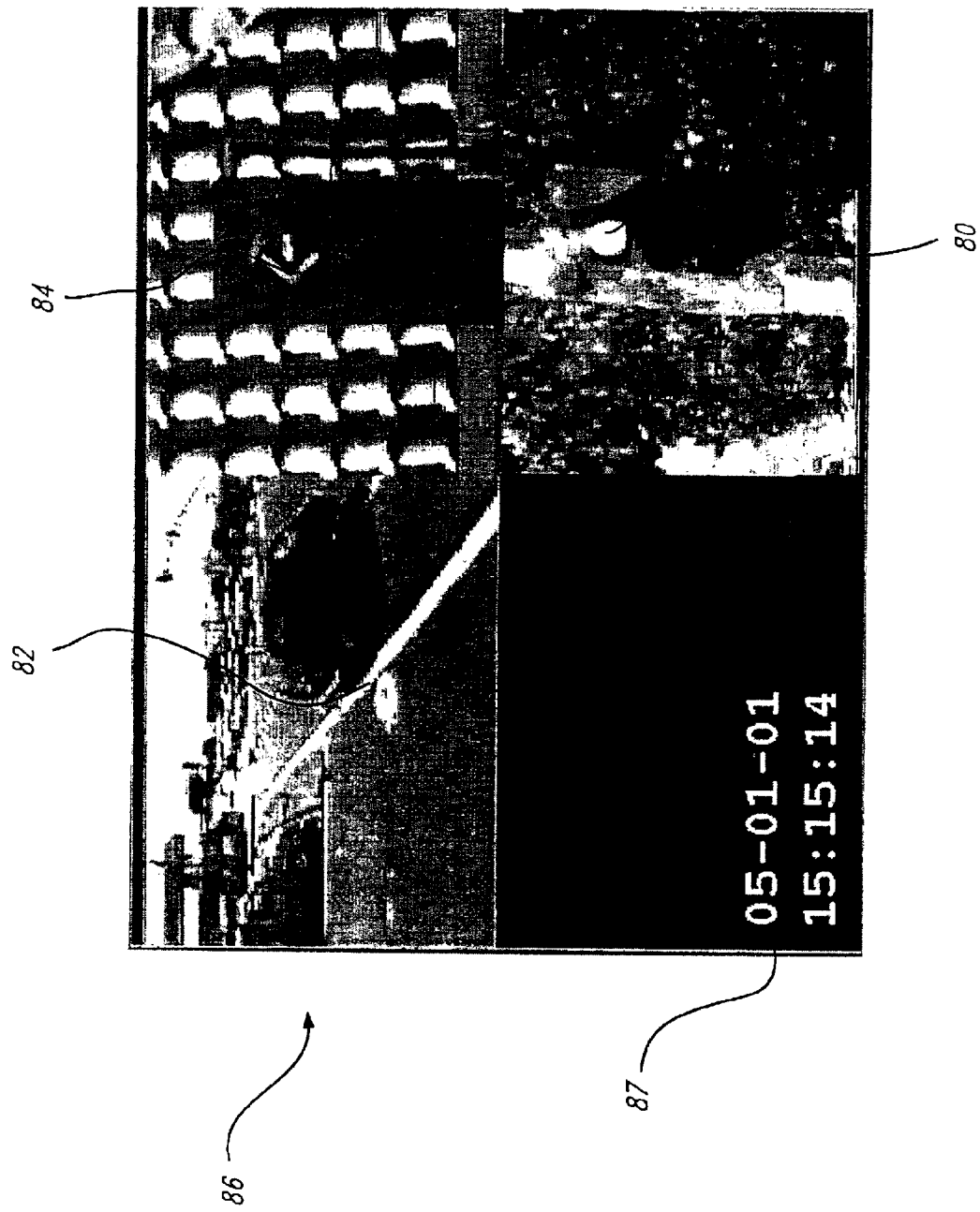
FIG. 13 shows a single frame image as recorded by the camera configuration of FIG. 12.

In another configuration, as illustrated in FIG. 12, the cameras 4 may be arranged to record a single approach 74 to an intersection 76, together with the traffic signals 80, 84 that govern that approach. In such an application, one wide-angle camera is positioned to cover that single approach and the stop bar 82 (the wide, white line across the road) at the intersection 76. A second telephoto or zoom lens camera is focused on the light signal 80 that controls the through traffic from that approach. A third camera may be focused on the left-hand turn signal 84, if such a signal exists, that controls the left-hand turn lane of that approach. The images of these three cameras again are routed through a screen splitting device, which records the three images from those cameras on a single video image 86 of the recording device. Generally a time and date stamp 88 is also applied to those images. FIG. 13 shows the video image 86 recorded from such a configuration. The image in the upper left quadrant of the screen shows traffic crossing the stop bar 82; the image in the upper right quadrant shows the left-hand turn signal 84; the image in the lower right quadrant shows the through traffic signal 80; and the time/date stamp 87, which indicates the moment this particular frame was recorded, is in the lower left quadrant of the video image. An individual viewing this image is able to see time synchronous images of the signals 80, 84, and the traffic passing those signals. In this way, photographic evidence of compliance to the traffic signals may be gathered.

The split-screen device 83 may be programmed to provide a horizontal split or a vertical split, or to provide four-way splits for a screen or any combination of the three split versions. The device may also be programmed to sequence automatically from one type of image to another, for example, a system may be set up at a railroad grade crossing, and configured to provide continuous coverage of the traffic at that crossing. As a train approaches, a detector on the track signals the approach of the train, and the splitting device 83 may switch to a split-screen, showing the approaching train as well as the traffic approaching the crossing. Other uses of this and other features will be obvious to those skilled in the arts.

In addition to those described, there are many other possible configurations, including the use of zoom cameras, fixed wide-angle cameras, black and white or color cameras, and infrared cameras, with or without built-in illumination. The cameras may be fixed in position or movable. They may be configured to respond to motion or to be controlled by a remote operator. More than four cameras 4 may be employed as necessary to fulfill the requirements of a particular application. Cameras may be mounted to a vertical pole, a horizontal arm, or an angled support. The recording device 20 may be an analog or digital tape recording device or a solid-state recording device, with the capability of recording real-time or time-lapse video for 24 hours or more.

According to the principles of the invention, this system is designed for short-term use, and may be installed or removed by one person in a few minutes.

According to one method of installation, the installer first attaches the bracket 56 to the back of the box. The box is then supported in the appropriate position beside the pole 10 while the straps 58 are wrapped around the pole. Once the straps are drawn tight the box is secure. The installer then affixes each of the camera brackets 60 to the pole 10 above the box 2 with straps 58. The cameras 4 are bolted to the camera brackets 60 via the camera arms 62. The conduit 8 is assembled and strapped to the pole 10, and cables 12 are attached to the cameras 4 and threaded through the conduit 8. The monitor is connected to the system and power is applied. If the cameras are equipped with pan and tilt controls, the operator simply adjusts the controls until the cameras 4 are properly configured. Alternatively, the operator tilts the monitor upward, to be visible from above the box. While mounting the cameras, the installer looks down at the monitor, manually adjusts the cameras until they are aimed correctly. The installer programs the recording device according to the specific requirements of the application, then disconnects and removes the monitor, and closes and locks the box.

Common applications of these systems include compliance studies as described before, railroad grade crossings also as described, traffic pattern studies, throughput studies, origin and destination studies, cordon studies, time vs. traffic studies, etc. The system may also be employed to observe non-vehicular traffic, including pedestrians, bicycles, skateboards video surveillance of public gatherings, animal control studies, etc.

Image retention is accomplished with a recording device in the box 2 at the camera site. However, another embodiment of the invention provides a transmitter in the box 2, wherefrom the video image may be transmitted to a remote location. For example, the multiple camera images may be processed as described above into a single split screen image 86 with a time/date stamp 88, and then transmitted via a high frequency transmitter to a receiver and recording device at a remote location. A phone link or a cellular phone link may be used as a transmission medium. The image may be transmitted via an Internet connection to a recording device or a remote viewer.

In the case of transmission to a remote location, the size of the box 2 may be much smaller, due to reduced power requirements, and the absence of a recording device.

According to a preferred embodiment, the recorded images are analyzed to extract the data required for the particular application. A software program is provided to permit an operator to view the video images and record the data.

Figure 14:
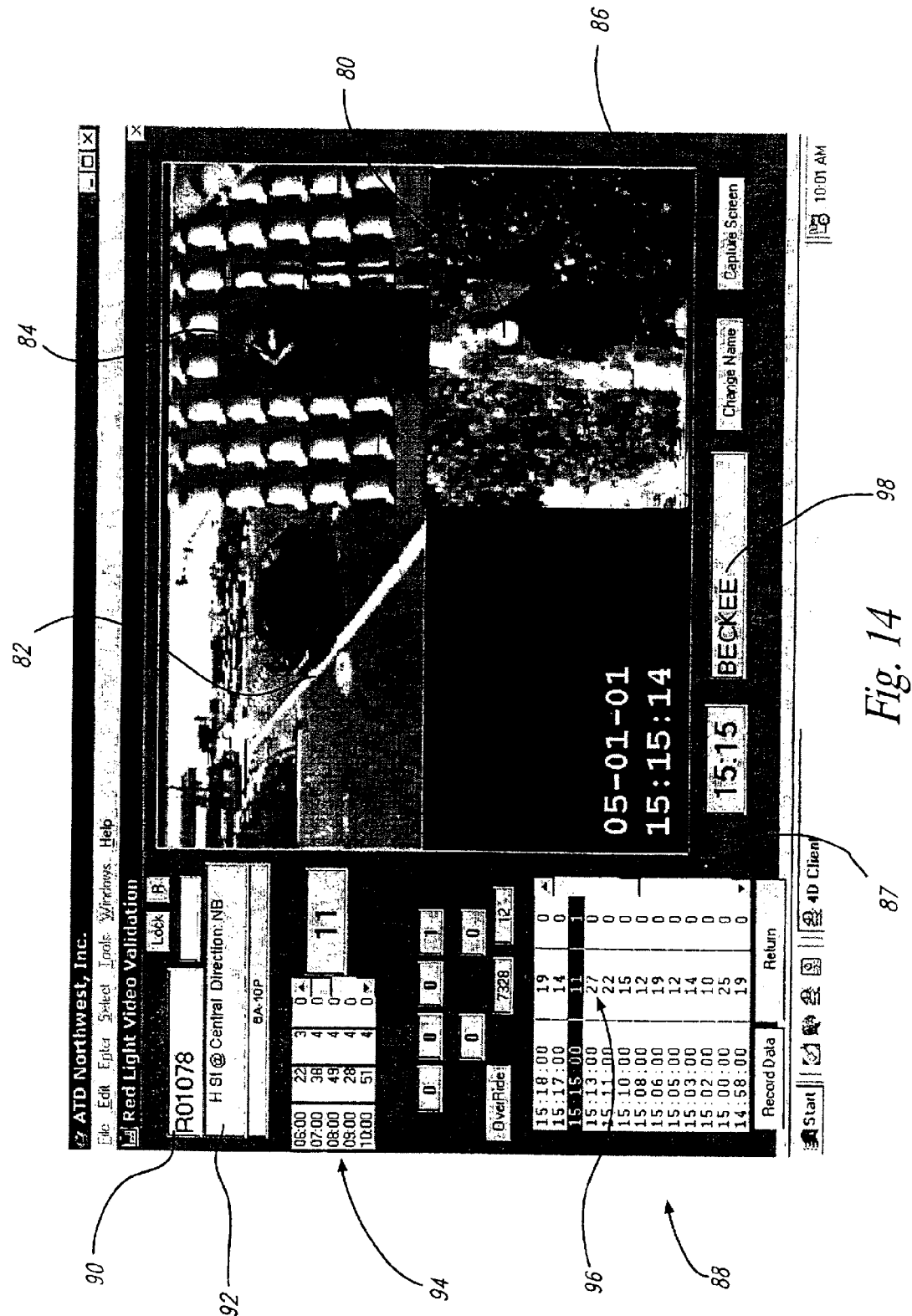
FIG. 14 shows the image of FIG. 13, framed by the fields of a software program for analyzing the data of the video images.

FIG. 14 shows a view 88 of a computer screen, on which the video image 86 of FIG. 13 is framed by the data fields of the software program. The configuration, as shown in FIG. 14, is the same as that shown in FIGS. 13 and 14, namely, one wide angle camera showing a stop bar 82, a zoom camera focused on a left turn signal 84, and a zoom camera focused on a through traffic signal 80. The program provides fields for pertinent data, including a tape designation number 90, the location of the intersection in question 9, the times of each signal change 94, the number of cars passing the stop bar during each green light, yellow light and red light 96, the name of the operator 98 etc. The program may be modified to accommodate a wide variety of requirements and data sets, including four way approaches to an intersection, traffic distribution studies, infraction studies, congestion analysis, etc.

The software program may include pattern or color recognition for automatically counting and timing light changes or vehicle passage.

During operation, the program is configured to automatically record the changes of the traffic signals by noting the color of a group of pixels in the image corresponding to the red, yellow and green signals of the traffic signals.

Meanwhile, the operator records each vehicle that passes by striking a key on a key board. The computer will automatically note the condition of the traffic lights as the operator notes vehicle behavior. It is possible for an experienced operartor to monitor the recording at speeds significantly faster than real time, and also to accurately monitor more aspects of the traffic than an operator could do on location. Furthermore, the operator may skip directly to periods of interest, rather than wait or return to the site, as would be required with on site monitoring. Thus the man hours spent monitoring are significantly reduced.

While specific examples have been given to illustrate novel features of the invention, the examples given are not intended to represent a complete list of the possible applications or variations that fall within the scope of the invention. Many other applications will become apparent to those skilled in the art, and are considered to be within the scope of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A video system, comprising:
    a plurality of video cameras configured to be mounted on a vertical pole a first distance above the ground;
    a box configured to be mounted on the pole a second distance, lower than the first distance, above the ground;
    a screen splitter located within the box and configured to receive a plurality of video images at each of a plurality of inputs and to combine the plurality of images into a single video image at an output;
    a video recorder located within the box and having an input coupled to the output of the screen splitting device; and
    connection means for coupling outputs of each of the plurality of video cameras to a respective one of the plurality of inputs of the screen splitting device.

2. The video system of claim 1, further comprising means for providing power to the plurality of video cameras, the screen splitter, and the video recorder.

3. The video system of claim 2 wherein the means for providing power comprises a battery.

4. The video system of claim 1, further comprising a conduit configured to be mounted on the vertical pole and having a first end located a short distance from the plurality of cameras and a second end located inside the box, and wherein the connection means comprises a plurality of cables, each configured to carry a video image from the camera, each of the plurality of cables having a first end attached to the output of a respective one of the video cameras and a second end attached to one of the inputs of the screen splitter, the pluralities passing inside the conduit from the first end of the conduit to the second end thereof.

5. The video system of claim 4 wherein the conduit is formed from a plurality of interlocking segments, and the number of segments is selectable according to the distance between the box and the plurality of video cameras.

6. The video system of claim 5 wherein the box includes a rack affixed to an inside surface of a door and configured to receive the segments of the conduit for storage.

7. The video system of claim 1 wherein the box includes a door having a gasket configured to prevent entry of moisture or foreign debris when closed.

8. The video system of claim 1 wherein the box includes a plurality of louvers on a sidewall thereof, the louvers configured to permit ventilation of the box while preventing moisture from entering the box.

9. The video system of claim 8 wherein the box includes brackets positioned on an inside surface of the sidewall such that an air filter may be inserted therein to filter air entering the box through the plurality of louvers.

10. The video system of claim 1 wherein the box includes legs on a bottom surface thereof, such that the box may be mounted on the pole close to the ground, with the legs in contact with the ground.

11. The video system of claim 1, further comprising timing means for activating the video recorder and the plurality of cameras at desired timing intervals.

12. The video system of claim 1 wherein the video recorder is a video tape recorder.

13. A video monitor system, comprising:
    a first video camera mounted on a utility pole adjacent to a traffic intersection at a height sufficient to have an unobstructed view of a first traffic signal light, the first camera aimed at and focused on the first signal light;
    a second video camera mounted on the utility pole close to the first video camera and aimed and focused on a stop bar of a lane or lanes of traffic controlled by the first signal light;
    a box mounted on the utility pole at a height lower than the first and second video cameras, the box including a lockable door;
    a screen splitter positioned inside the box and configured to combine the video images from the first and second video cameras into a single video image;
    first and second connecting cables connected at first ends thereof to the first and second video cameras, respectively, and at second ends thereof to first and second inputs of the screen splitter; and
    a video image recorder positioned inside the box, coupled to the screen splitter, and configured to record the combined video image from the screen splitter, affixing a time and date stamp to each frame of the video image.

14. The video monitor system of claim 13, further comprising:
    a third video camera mounted on the utility pole close to the first and second cameras and focused on a second traffic signal light, the second signal light being a left hand turn control light for traffic approaching the stop bar;
    a third connecting cable connected at a first end to the third camera and at a second end to a third input of the screen splitter, and wherein the screen splitter is further configured to combine the video image from the third camera with that of the first and second cameras into a single image.

15. The video monitor system of claim 13, further comprising a conduit extending from a position close to the first and second video cameras into the interior of the box, through which passes the first and second connecting cables.

16. A method, comprising:
    collecting a first video image of a first traffic signal light from a first camera mounted on a pole adjacent to a traffic intersection;
    collecting a second video image of a lane or lanes of traffic passing a stop bar of an intersection, the lane or lanes controlled by the first traffic signal, from a second camera mounted on the pole;

combining the first video image and the second video image such that both images appear as split screen images of a single video image; and recording the single video image of the combining step, together with a time and date stamp on each frame of the video image, onto a video medium, the combining and recording steps being performed by equipment secured in a box mounted on the pole below the first and second cameras.

17. The method of claim 16, further comprising viewing the single video image and counting vehicles crossing the stop bar, the counting correlated with the times indicated by the time and date stamps.

18. The method of claim 16, further comprising viewing the single video image and counting vehicles crossing the stop bar during periods that the image of the first traffic signal light displays a red light.

19. The method of claim 16, further comprising collecting a third video image of a second traffic signal light, the second light controlling left turn traffic at the stop bar, and from a third camera mounted on the pole, and wherein the combining step includes combining the third video image with the first and second images into a single video image.

20. The method of claim 19, further comprising viewing the single video image and counting vehicles turning left at the stop bar during periods that the image of the second traffic signal light displays a red left turn arrow.

21. The video system of claim 1 wherein the box is configured to be repositionaly mounted to the pole.

* * * * *

UNITED STATES PATENT AND TRADEMARK OFFICE
CERTIFICATE OF CORRECTION

PATENT NO. : 6,961,079 B2
DATED : November 1, 2005
INVENTOR(S) : Kenneth Kaylor et al.

It is certified that error appears in the above-identified patent and that said Letters Patent is hereby corrected as shown below:

Column 12,
Line 14, "respositionaly" should read -- repositionably --.

Signed and Sealed this

Twenty-eighth Day of February, 2006

JON W. DUDAS
*Director of the United States Patent and Trademark Office*